(12) United States Patent
Yokoyama

(10) Patent No.: US 8,965,968 B2
(45) Date of Patent: Feb. 24, 2015

(54) COMPUTER-READABLE MEDIUM STORING SYSTEM VISUALIZATION PROCESSING PROGRAM, METHOD AND DEVICE

(75) Inventor: Ken Yokoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1072 days.

(21) Appl. No.: 13/010,148

(22) Filed: Jan. 20, 2011

(65) Prior Publication Data

US 2011/0185022 A1 Jul. 28, 2011

(30) Foreign Application Priority Data

Jan. 26, 2010 (JP) .................................. 2010-14826

(51) Int. Cl.
*G06F 15/16* (2006.01)
*H04L 12/24* (2006.01)
*H04L 29/06* (2006.01)

(52) U.S. Cl.
CPC .............. *H04L 41/22* (2013.01); *H04L 41/069* (2013.01); *H04L 63/0209* (2013.01); *H04L 63/1425* (2013.01)
USPC ......................................................... 709/204

(58) Field of Classification Search
CPC .............. H04L 41/069; H04L 63/1425; H04L 63/0209; H04L 63/1408; H04L 63/02; H04L 63/0218; H04L 43/18; H04L 45/3065; H04L 12/2602; H04L 62/0209
USPC ......................................................... 709/204
See application file for complete search history.

(56) References Cited

U.S. PATENT DOCUMENTS

| | | | |
|---|---|---|---|
| 2004/0034793 A1* | 2/2004 | Yuan | 713/200 |
| 2005/0289231 A1* | 12/2005 | Harada et al. | 709/224 |
| 2007/0230285 A1* | 10/2007 | Nakagawa | 368/47 |

FOREIGN PATENT DOCUMENTS

JP     2006-11683     1/2006

* cited by examiner

*Primary Examiner* — Jerry Dennison
(74) *Attorney, Agent, or Firm* — Oblon, Spivak, McClelland, Maier & Neustadt, L.L.P.

(57) ABSTRACT

A device carries out a receiving process to receive a message transmitted or received by a server from a communication device connected to the server. The device stores the message in a message storing unit in connection with a time when the receiving process is carried out. The device extracts a message for synchronization from the message storing unit. The device produces log data including identification data to identify the message for synchronization and a time when the message for synchronization is received. The device produces log data including a time when a message other than the message for synchronization is received. The device stores the log data in a log data storing unit. The device transmits the log data stored in the log data storing unit to a log data processing device connected to a network on an opposite side of a firewall connected to the communication device.

11 Claims, 22 Drawing Sheets

FIG. 10

| TIME OF MESSAGE RECEIVING | IDENTIFICATION NUMBER | PROTOCOL NAME | MESSAGE TYPE | OBJECT | IDENTIFICATION DATA |
|---|---|---|---|---|---|
| 00:00:00.100, | 1-1, | IIOP | REQUEST | MODULE/CLASS/AAAA, | sync=192.168.0.1&1000, |

FIG. 11

```
00:00:00.000,2-1,HTTP,REQUEST,POST/cgi-bin/login.cgi,,
00:00:00.050,2-2,IIOP,REQUEST,MODULE/CLASS/LOGIN,sync=192.168.0.1&1000
00:00:00.150,2-2,IIOP,RESPONSE,,sync=192.168.0.2&2000
00:00:00.200,2-1,HTTP,RESPONSE,,,
```

FIG. 12

```
00:00:00.100,1-1,IIOP,REQUEST,MODULE/CLASS/LOGIN,sync=192.168.0.1&1000
00:00:00.120,1-2,SQL,REQUEST,SELECT USERID FROM USER_TABLE,
00:00:00.150,1-2,SQL,REQUEST,,
00:00:00.200,1-1,IIOP,RESPONSE,sync=192.168.0.2&2000
```

FIG. 17

```
00:00:00.050,2-1,HTTP,REQUEST,POST/cgi-bin/login.cgi
00:00:00.250,2-1,HTTP,RESPONSE,
```

FIG. 18

```
00:00:00.070,1-2,SQL,REQUEST,SELECT USERID FROM USER_TABLE
00:00:00.100,1-2,SQL,RESPONSE,
```

FIG. 19

```
00:00:00.050,2-1,HTTP,REQUEST,POST/cgi-bin/login.cgi,
00:00:00.100,1-1,IIOP,REQUEST,MODULE/CLASS/LOGIN
00:00:00.120,1-2,SQL,REQUEST,SELECT USERID FROM USER_TABLE
00:00:00.150,1-2,SQL,REQUEST,
00:00:00.200,1-1,IIOP,RESPONSE,
00:00:00.250,2-1,HTTP,RESPONSE,
```

FIG. 20

```
00:00:00.000,2-1,HTTP,REQUEST,POST/cgi-bin/login.cgi
00:00:00.050,2-2,IIOP,REQUEST,MODULE/CLASS/LOGIN
00:00:00.070,1-2,SQL,REQUEST,SELECT USERID FROM USER_TABLE
00:00:00.100,1-2,SQL,RESPONSE,
00:00:00.150,2-2,IIOP,RESPONSE,
00:00:00.200,2-1,HTTP,RESPONSE,
```

COMPUTER-READABLE MEDIUM STORING SYSTEM VISUALIZATION PROCESSING PROGRAM, METHOD AND DEVICE

CROSS-REFERENCE TO RELATED APPLICATIONS

This application is based upon and claims the benefit of priority of the prior Japanese Patent Application No. 2010-014826, filed on Jan. 26, 2010, the entire contents of which are incorporated herein by reference

FIELD

The embodiments discussed herein are related to visualization of a transaction in a system to be analyzed.

BACKGROUND

Assume as illustrated in FIG. 1, e.g., that a system to be analyzed connected to a client terminal (not illustrated) through a firewall 1000 includes a Web server 1002, an application server 1004 and a DB server 1006 connected to one switch or a plurality of switches (switches A and B in FIG. 1). Such a system to be analyzed copies a message (e.g., an HTTP (Hyper Text Transfer Protocol) message, an IIOP (Internet Inter-ORB Protocol) message or an SQL (Structured Query Language) message) transmitted and received through the switches by means of port monitoring functions of the switches A and B, and transmits the copy of the message to a system visualization device 1100 connected to the switches A and B. The system visualization device 1100 analyzes the received message so as to visualize a transaction in the system to be analyzed.

Then, it can be known that transactions are done in the system to be analyzed, e.g., as illustrated in FIG. 2. That is, the client terminal outputs an HTTP request to the Web server 1002, and the Web server 1002 outputs an IIOP request to the application server 1004 upon receiving the HTTP request. Upon receiving the IIOP request, the application server 1004 outputs an SQL request divided into three parts to the DB server 1006 in order. Every time upon receiving one of the parts of the SQL request, the DB server 1006 carries out a process and transmits an SQL response back to the application server 1004. Upon receiving a third response from the DB server 1006, the application server 1004 transmits an IIOP response back to the Web server 1002. Upon receiving the IIOP response, the Web server 1002 transmits an HTTP response back to the client terminal.

The network inside the firewall 1000 not being divided into a plurality of segments in accordance with security levels or something, as described above, does not cause a problem in particular. As illustrated in FIG. 3, however, a network divided into a plurality of segments by means of introduction of a DMZ (DeMilitarized Zone) causes a problem. That is, if a single unit of the system visualization device 1100 is connected to the switch B similarly as in FIG. 1, it is supposed to connect the switch A to the system visualization device 1100 across the segments and to transmit an HTTP message copied by the switch A to the system visualization device 1100. It can be prohibited in some cases, however, to connect segments of different security levels to each other without relaying them through a firewall B, resulting in that the system visualization device 1100 can capture only IIOP and SQL messages, and that the transactions cannot be correctly visualized.

Incidentally, as a method for transmitting the HTTP message copied by the switch A to the system visualization device 1100 through the firewall B excessively increases a processing load of the firewall B, such a method significantly causes unfavorable effects such as a degraded throughput across the entire system. Further, the system visualization device 1100 carries out processes for recording a time when a message is received and for sorting the message by using the time when the message is received. Thus, if a big time lag is caused between the recorded time when the message is received and a time when the Web server 1002 received the HTTP message, analysis accuracy of the system visualization device 1100 is significantly affected.

SUMMARY

A device carries out a receiving process to receive a message transmitted or received by a server from a communication device connected to the server. The device stores the message in a message storing unit in connection with a time when the receiving process is carried out. The device extracts a message for synchronization from the message storing unit. The device produces log data including identification data to identify the message for synchronization and a time when the message for synchronization is received. The device produces log data including a time when a message other than the message for synchronization is received. The device stores the log data in a log data storing unit. The device transmits the log data stored in the log data storing unit to a log data processing device connected to a network on an opposite side of a firewall connected to the communication device.

The object and advantages of the invention will be realized and attained at least the features, elements, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 10 illustrates a format of a protocol log;
FIG. 11 illustrates example data stored in a second protocol log storing unit of the first system visualization device and in a protocol log storing unit of the second system visualization device;
FIG. 12 illustrates example data stored in a first protocol log storing unit of the first system visualization device.

FIG. 17 illustrates an example post-correction protocol log stored in the second protocol log storing unit upon the first protocol log being the reference;

FIG. 18 illustrates an example post-correction protocol log stored in the first protocol log storing unit upon the second protocol log being the reference;

FIG. 19 illustrates example data stored in a post-correction protocol log storing unit upon the first protocol log being the reference;

FIG. 20 illustrates example data stored in a post-correction protocol log storing unit upon the second protocol log being the reference;

DESCRIPTION OF EMBODIMENTS

Figure 4:
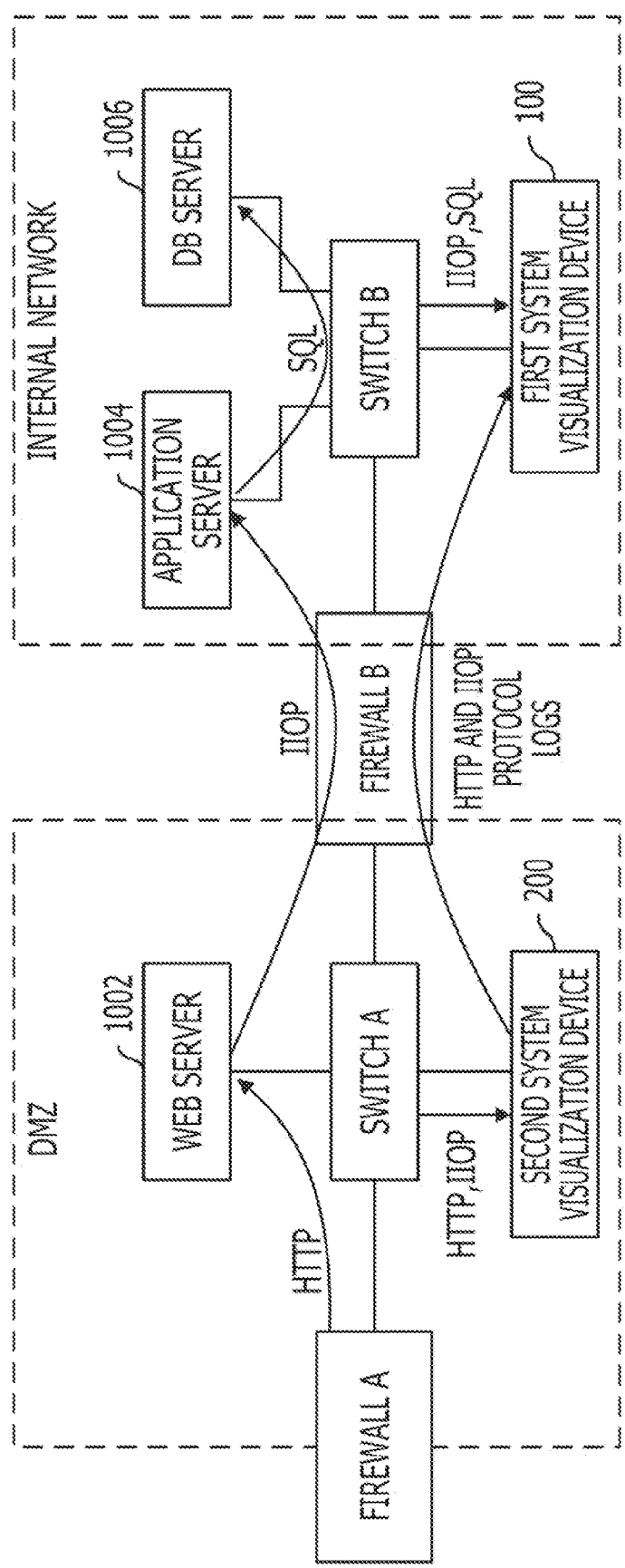
FIG. 4 schematically illustrates a system of an embodiment.

A system of an embodiment disclosed herewith will be schematically explained by the use of FIG. 4. FIG. 4 illustrates a firewall A connected to a client terminal through an external network such as the Internet, and a network inside the firewall A divided into a DMZ and an internal network by a firewall B. The DMZ includes a switch A having a port monitoring function and connected to the firewalls A and B and a Web server 1002. Further, the switch A is connected to a second system visualization device 200 as well, copies messages (e.g., HTTP and IIOP messages) transmitted and received by the switch A and outputs the copied messages to the second system visualization device 200. What the second system visualization device 200 processes will be described later in detail.

Further, the internal network includes a switch B having a port monitoring function and connected to the firewall B, an application server 1004 and a DB server 1006. Further, the switch B is connected to a first system visualization device 100 as well, copies messages (e.g., IIOP and SQL messages) transmitted and received by the switch B and outputs the copied messages to the first system visualization device 100. What the first system visualization device 100 processes will be described later in detail.

According to the embodiment, as illustrated in FIG. 4, the second system visualization device 200 is provided in the DMZ and produces a protocol log. Then, the second system visualization device 200 transmits a protocol log of HTTP and IIOP messages to the first system visualization device 100 through the firewall B. As the second system visualization device 200 is not directly connected to the first system visualization device 100 and a message itself is not transmitted through the firewall B, the first system visualization device 100 can collect necessary data without causing a problem in security or an excessive processing or communication load of the firewall B.

Further, as the second system visualization device 200 captures the IIOP message and so does the first system visualization device 100, the IIOP message is used as a message for synchronization. Specifically, upon capturing the IIOP message, the second system visualization device 200 adds identification data to a corresponding protocol log and transmits the protocol log to the first system visualization device 100. Upon capturing the IIOP message, the first system visualization device 100 adds identification data to a corresponding protocol log as well. Then, the first system visualization device 100 extracts the protocol log received from the second system visualization device 200 and including the identification data, and extracts a produced protocol log including identification data which is same as the identification data included in the protocol log, so as to calculate a difference in time stamps (e.g., the times when the messages are received). The first system visualization device 100 corrects a time stamp of another protocol log by using the time stamp difference as calculated above, so as to correct a time lag caused between the second system visualization device 200 and the first system visualization device 100. The first system visualization device 100 can thereby carry out a correct analysis process, so as to correctly grasp a transaction in operation.

Figure 5:
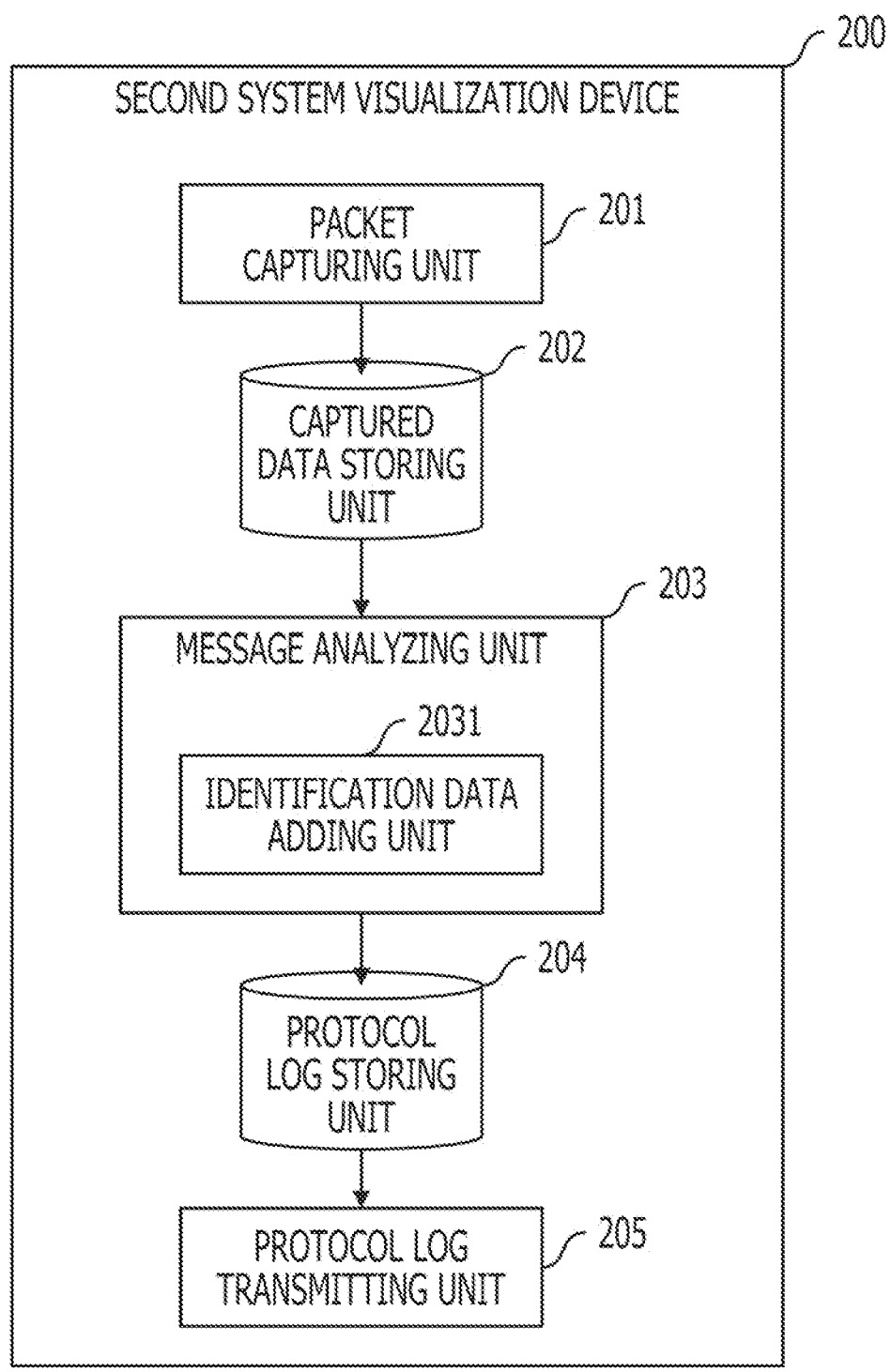
FIG. 5 illustrates a functional block diagram of a second system visualization device.

FIG. 5 illustrates a functional block diagram of the second system visualization device 200. The second system visualization device 200 has (A) a packet capturing unit 201 which receives a packet from the switch A, (B) a captured data storing unit 202 in which data of the packet received by the packet capturing unit 201 is stored, (C) a message analyzing unit 203 which extracts particular data from the packet stored in the captured data storing unit 202, (D) a protocol log storing unit 204 in which data of a protocol log, e.g., a result of the process of the message analyzing unit 203 is stored, and (E) a protocol log transmitting unit 205 which transmits the protocol log stored in the protocol log storing unit 204 to the first system visualization device 100 through the firewall B and the switch B at a regular timing. Incidentally, the message analyzing unit 203 includes an identification data adding unit 2031.

Figure 6:
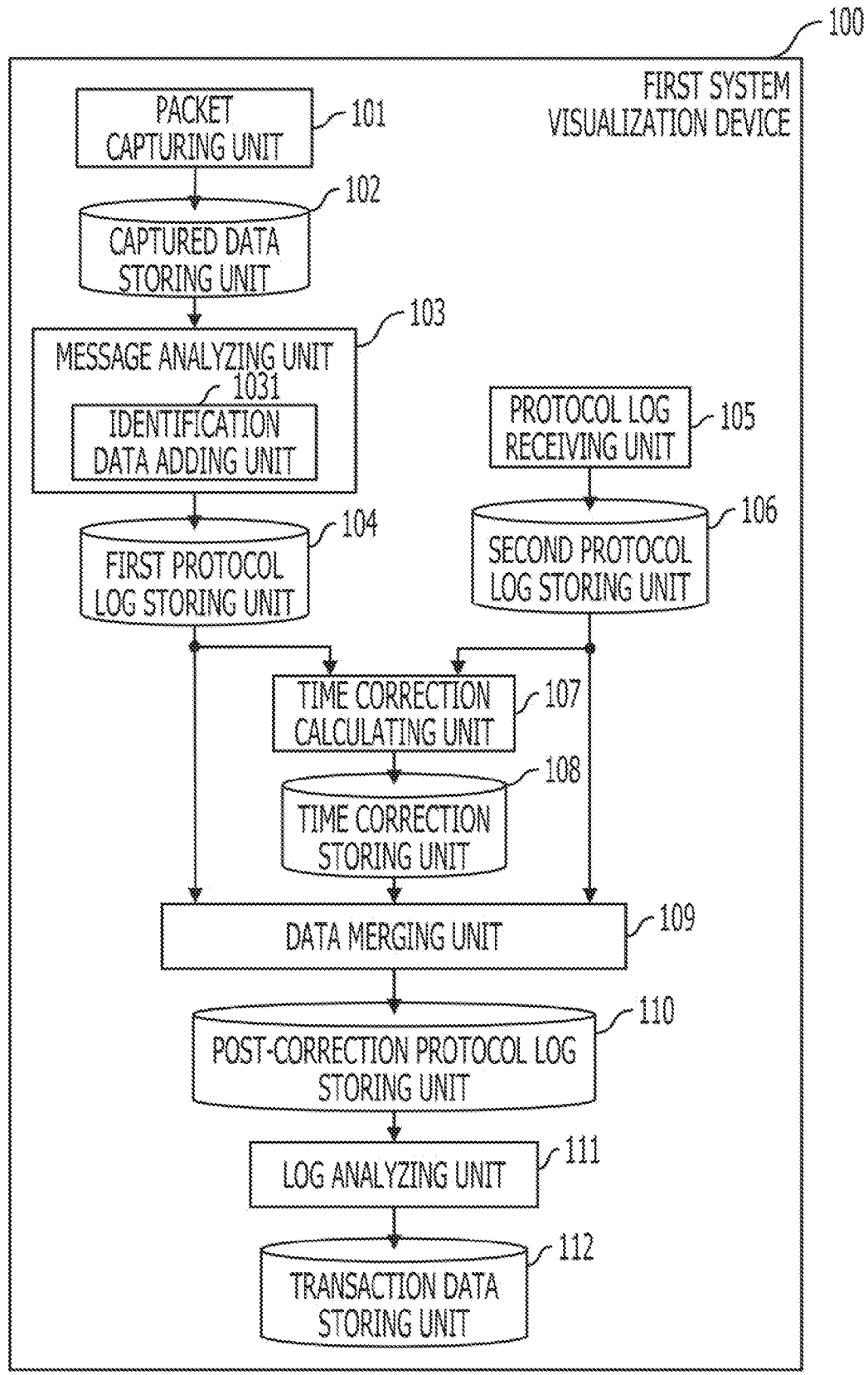
FIG. 6 illustrates a functional block diagram of a first system visualization device.

Further, FIG. 6 illustrates a functional block diagram of the first system visualization device 100. The first system visualization device 100 has (A) a packet capturing unit 101 which receives a packet from the switch B, (B) a captured data storing unit 102 in which data of the packet received by the packet capturing unit 101 is stored, (C) a message analyzing unit 103 which extracts particular data from the packet stored in the captured data storing unit 102, and (D) a first protocol log storing unit 104 in which data of a protocol log, e.g., a result of the process of the message analyzing unit 103 is stored. Incidentally, the message analyzing unit 103 includes an identification data adding unit 1031. The first system visualization device 100 has the configuration explained above in common with the second system visualization device 200.

The first system visualization device 100 further has (E) a protocol log receiving unit 105 which receives data of a protocol log from the second system visualization device 200, (F) a second protocol log storing unit 106 in which the protocol log received by the protocol log receiving unit 105 is stored, (G) a time correction calculating unit 107 which calculates a time correction value from the protocol logs stored in the first and second protocol log storing units 104 and 106, (H) a time correction storing unit 108 in which the time correction value, e.g., a result of the process of the time correction calculating unit 107 is stored, (I) a data merging unit 109 which carries out a time correction process and a log merging process on the protocol logs stored in the first and second protocol log storing units 104 and 106 on the basis of the time correction value stored in the time correction storing unit 108, (J) a post-correction protocol log storing unit 110 in which a result of the process of the data merging unit 109 is stored, (K) a log analyzing unit 111 which carries out a log analysis process by using the data stored in the post-correction protocol log storing unit 110, and (L) a transaction data storing unit 112 in which a result of the process of the log analyzing unit 111 is stored.

Incidentally, the transaction data storing unit 112 outputs data stored therein as requested by a user terminal of an administrator.

Figure 7:
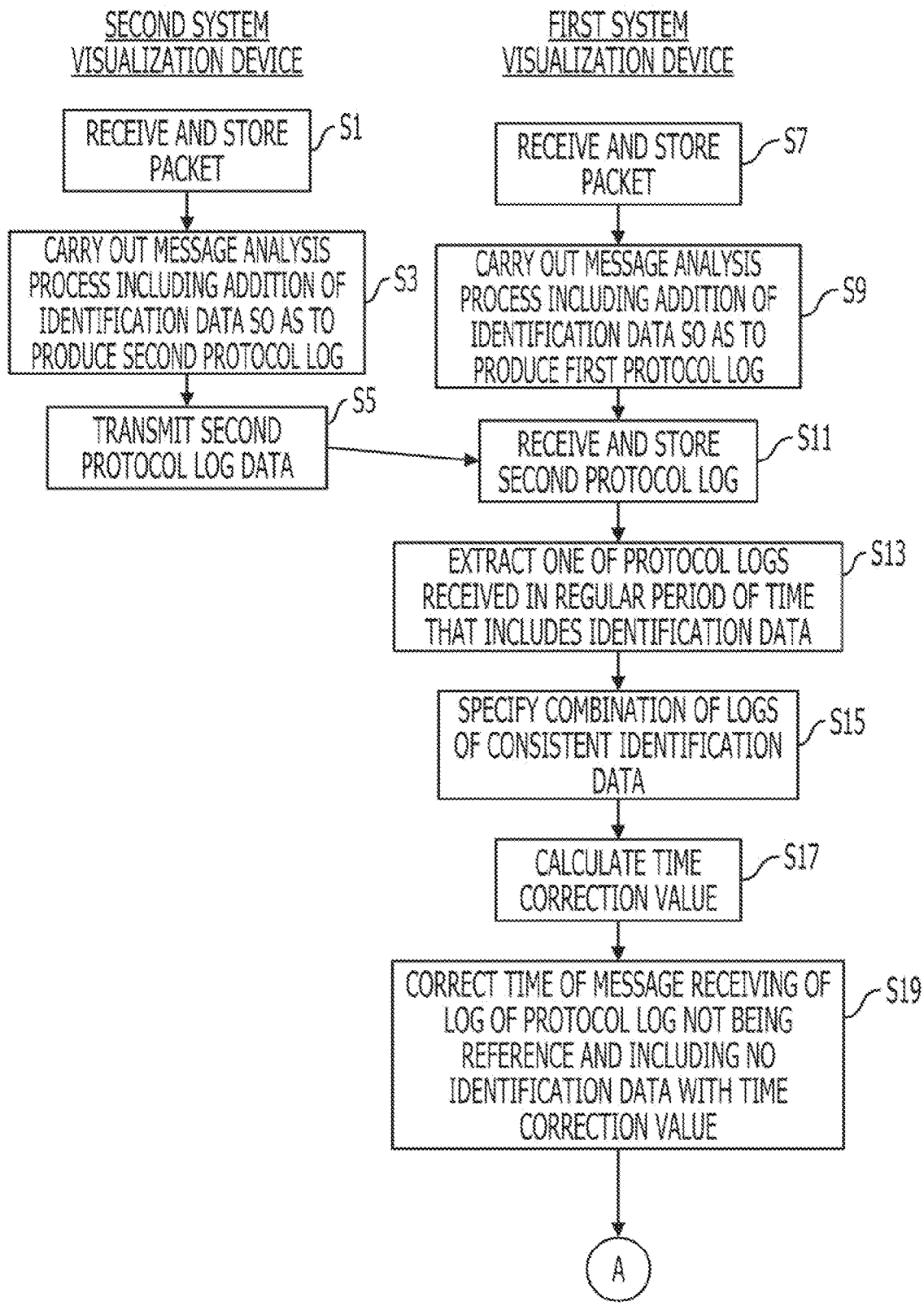
FIG. 7 illustrates a main processing flow of the embodiment.

Then, an operation of the system illustrated in FIG. 4 will be explained by the use of FIGS. 7-21. The packet capturing unit 201 of the second system visualization device 200 receives from the switch A a packet which passes through the switch A, and stores the received packet in association with the time when the packet is received in the captured data storing unit 202 (FIG. 7: step S1). Further, the message analyzing unit 203 carries out a message analysis process on the message stored in the captured data storing unit 202 including identification data added to the message by the identification data adding unit 2031, so as to produce a second protocol log and to store the second protocol log in the protocol log storing unit 204 (step S3). As the message analysis process is disclosed in Japanese Unexamined Patent Application Publication No. 2006-11683 in detail, the part of the process related to the addition of the identification data will be described herewith.

Figure 8:
FIG. 8 illustrates an example packet format.

According to the message analysis process, the message analyzing unit 203 extracts an identification number, a protocol name, a message type and an object for the message of the packet stored in the captured data storing unit 202 from the data of the packet. As illustrated in FIG. 8, e.g., the packet includes an IP header, a TCP header and a TCP payload formed by an upper layer protocol (e.g., HTTP, IIOP or SQL) header and a payload. According to the message analysis process, the message analyzing unit 203 extracts the data described above mainly from the IP, TCP and upper layer protocol headers.

Figure 9:
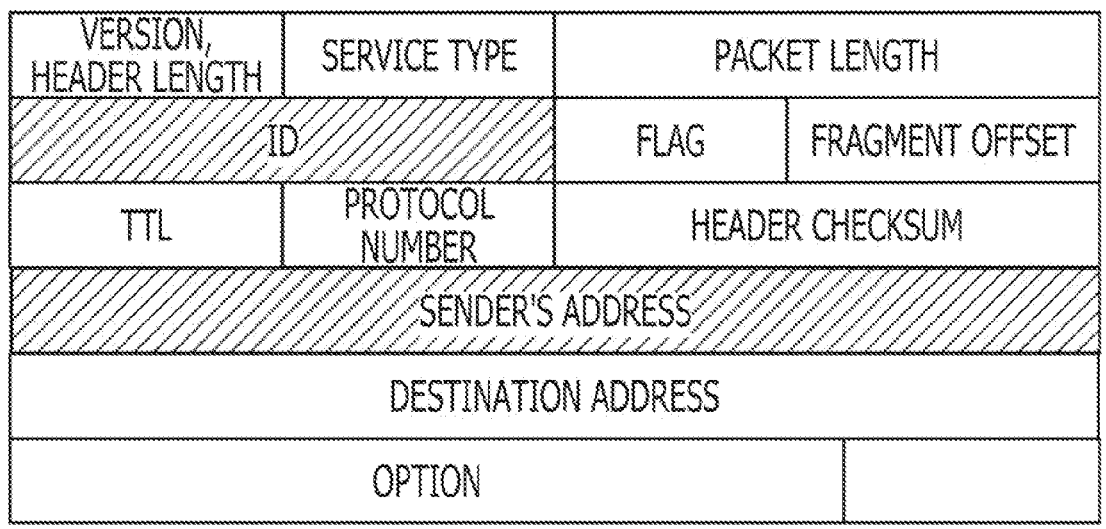
FIG. 9 illustrates a format of an IP header.

Further, the identification data adding unit 2031 extracts, from the packet, identification data which ensures that individual messages can be identified in a regular period of time, e.g., one minute. The identification data is called a synchronization keyword as well. The identification data adding unit 2031 extracts a sender's address and an ID from the IP header (having a format as illustrated in FIG. 9 in case of IPv4), and combines the sender's address and the ID so as to produce the identification data. This method can be applied without causing a problem regardless of which protocol provides a message to be employed as the message for synchronization.

FIG. 10 illustrates an example protocol log in a case in which, e.g., a character string "sync=" that indicates being identification data linked to a combination of the sender's address and the ID is employed as the identification data. The example illustrated in FIG. 10 includes a time "00:00:00.100" when the message is received, an identification number "1-1" of the message, a protocol name "IIOP", a message type "Request", an object "Module/Class/AAAA" and identification data "sync=192.168.0.1&1000".

If the IIOP message is the message for synchronization, however, the identification number of the message can be employed as the identification data. The identification number "1-1" includes a session ID (the first "1") and a request ID (the second "1"), and can be used as the identification data. That is, if it is known that the IIOP message is the message for synchronization in advance, the message analyzing unit 203 carries out only the ordinary message analysis process without working the identification data adding unit 2031 in some cases.

If the message analyzing unit 203 carries out the message analysis process, a protocol log illustrated, e.g., in FIG. 11 is stored in the protocol log storing unit 204. FIG. 11 illustrates an example in which packets are captured in order of an HTTP request, an IIOP request, an IIOP response and an HTTP response. Incidentally, an object lacking specific data is not included in the protocol log. Further, as the IIOP message is the message for synchronization in this case, the protocol log includes no identification data except in the IIOP message.

Return to the explanation of the process illustrated in FIG. 7. The protocol log transmitting unit 205 reads the protocol log from the protocol log storing unit 204, and transmits the protocol log to the first system visualization device 100 through the firewall B and the switch B as the second protocol log (step S5).

Meanwhile, the packet capturing unit 101 of the first system visualization device 100 receives a packet that passes through the switch B from the switch B, and stores the packet in the captured data storing unit 102 in association with the time when the packet is received (step S7). The packet stored in the captured data storing unit 102 is a packet transmitted and received by the application server 1004 and the DB server 1006, except for a packet addressed to the first system visualization device 100. Further, the message analyzing unit 103 carries out a message analysis process on the message stored in the captured data storing unit 102 including identification data added to the message by the identification data adding unit 1031, so as to produce a first protocol log and to store the first protocol log in the first protocol log storing unit 104 (step S9). The step S9 is substantially the same process as the step S3, and its explanation is omitted.

Assume, e.g., that a protocol log illustrated in FIG. 12 is stored in the first protocol log storing unit 104. FIG. 12 illustrates an example in which packets are captured in order of an IIOP request, an SQL request, an SQL response and an IIOP response.

Then, the protocol log receiving unit 105 of the first system visualization device 100 receives the second protocol log from the second system visualization device 200 and stores the second protocol log in the second protocol log storing unit 106 (step S11). The protocol log illustrated in FIG. 11 is stored in the second protocol log storing unit 106.

Then, the time correction calculating unit 107 extracts one of protocol logs received in a regular period of time (e.g., in one minute just before the present time) that includes the identification data from the first protocol log storing unit 104 and the second protocol log storing unit 106 (step S13). For the second protocol log illustrated in FIG. 11, the second and third logs are read. For the first protocol log illustrated in FIG. 12, the first and fourth logs are read.

Then, the time correction calculating unit 107 specifies a combination of protocol logs of consistent identification data, calculates a time lag for every combination and stores them in a storage device such as a main memory (step S15). The second log of the second protocol log agrees with the first log of the first protocol log in the identification data "sync=192.168.0.1&1000". Further, the third log of the second protocol log agrees with the fourth log of the first protocol log in the identification data "sync=192.168.0.2&2000".

Figure 13:
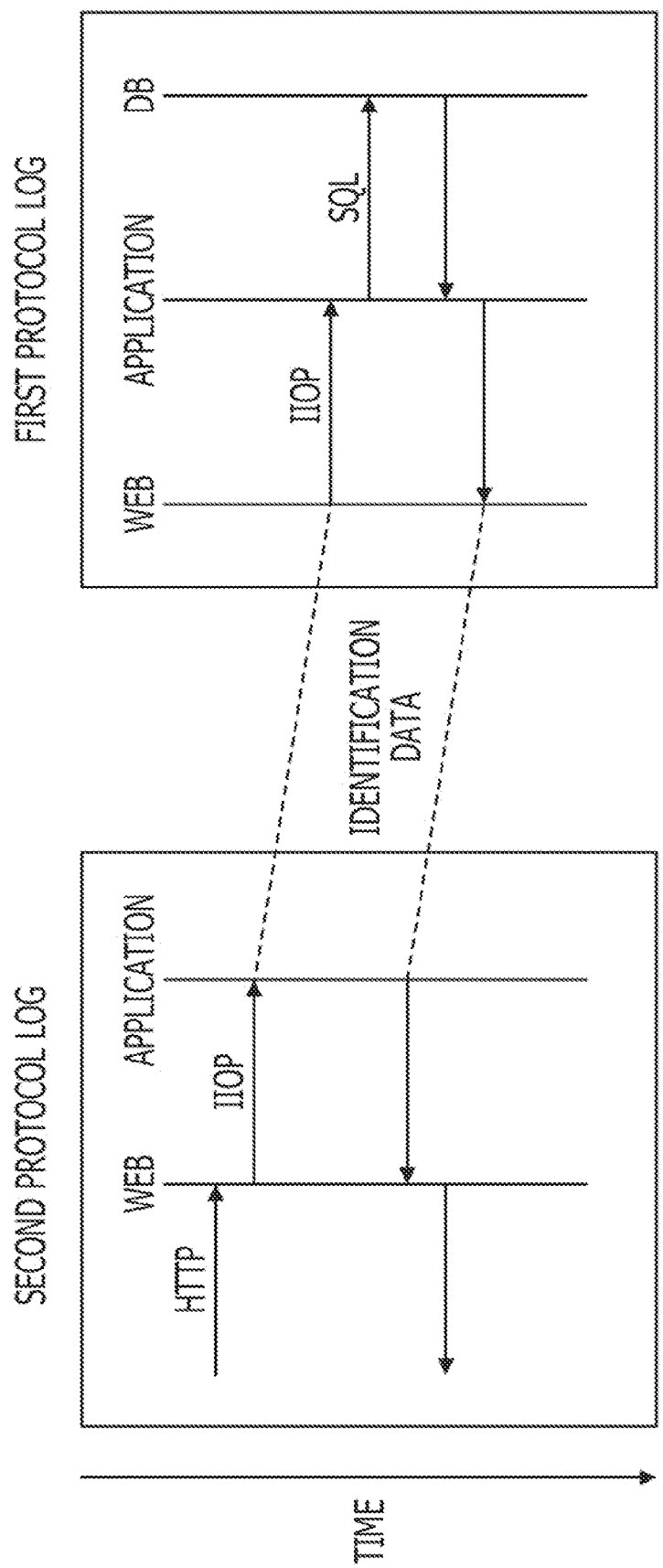
FIG. 13 illustrates an example message sequence grasped by first and second protocol logs.

A sequence of the messages specified by the second protocol log is represented as illustrated on a left side in FIG. 13. Further, a sequence of the messages specified by the first protocol log is represented as illustrated on a right side in FIG. 13. A pair of messages of the same identification data is specified as described above, and is represented by a dotted line in the middle of FIG. 13. As illustrate in FIG. 13, the messages of the first protocol log are received later than the messages of the second protocol log.

Thus, if the time lag is calculated as viewed from the first protocol log being the reference, the time lag calculated for the first combination is "−50" msec from the times when the messages are received "00:00:00.050" and "00:00:00.100". Further, the time lag calculated for the second combination is "−50" msec from the times when the messages are received "00:00:00.150" and "00:00:00.200".

Although the example of the first protocol log being the reference is presented, the second protocol log can be the reference. As viewed from the second protocol log being the reference, the time lag of "+50" msec is calculated twice.

Then, the time correction calculating unit 107 calculates a time correction value from the time lag calculated at the step S17, and stores the time correction value in the time correction storing unit 108 (step S17). The time correction calculating unit 107 employs, e.g., a statistical value such as the mean, the mode or the median as the time correction value. Upon the mean being employed while the first protocol log is being the reference, the time correction value of the example described above is "−50" msec. Incidentally, upon the second protocol log being the reference, the time correction value of the example described above is "+50" msec.

Then, the data merging unit 109 corrects the time of message receiving of a log of the protocol log not being the reference and including no identification data in a regular period of time with the time correction value stored in the time correction storing unit 108. The data merging unit 109 stores the corrected time, e.g., in the original log storing unit (the first protocol log storing unit 104 or the second protocol log storing unit 106) (step S19). Upon the first protocol log being the reference, the data merging unit 109 corrects the time of message receiving of the first and fourth logs (FIG. 11) of the second protocol log including no identification data are received. To put it specifically, the data merging unit 109 calculates (the time of message receiving of the log−the time correction value). For the example described above, the data merging unit 109 consequently corrects the time of message receiving "00:00:00.000" to "00.00.00.050", and further corrects "00:00:00.200" to "00.00.00.250".

Figure 14:
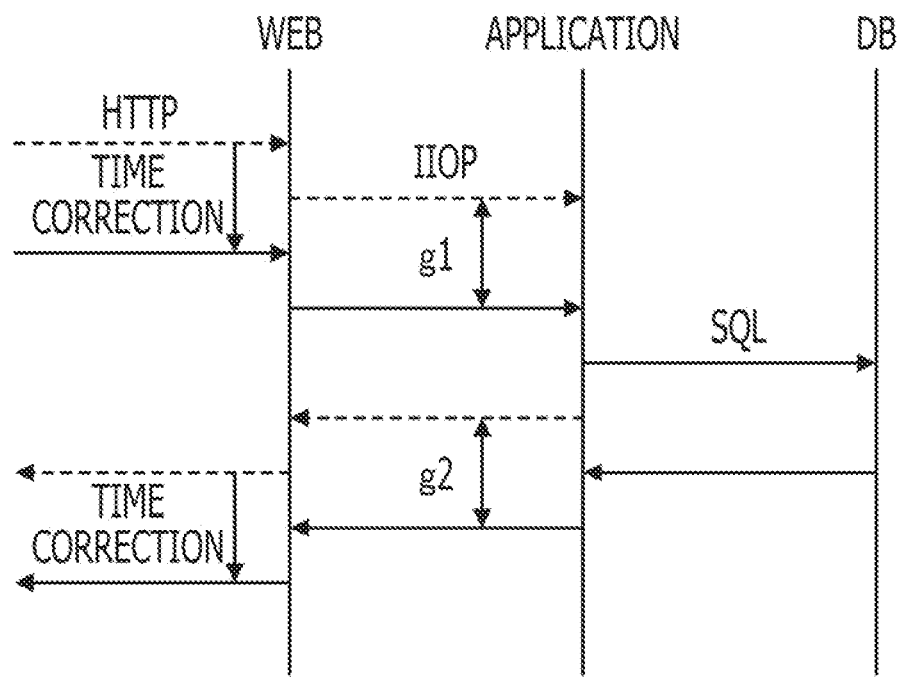
FIG. 14 schematically explains a time lag and time correction upon the first protocol log being a reference.

Overlap the sequence diagrams on the left and right sides in FIG. 13 to obtain a sequence diagram illustrated in FIG. 14. Calculate a time lag g1 between the IIOP requests (the dotted and solid lines represent the second and first protocol logs, respectively) and a time lag g2 between the IIOP responses (the dotted and solid lines represent the second and first protocol logs, respectively), and calculate the time correction value from the time lags g1 and g2. Upon the first protocol log being the reference, correct the time when the HTTP message on the dotted arrow line included in the second protocol log is received to the time when the HTTP message on the solid arrow line is received with the time correction value as indicated by a downward arrow.

Meanwhile, upon the second protocol log being the reference, the data merging unit 109 corrects the time of message receiving of the second and third logs (FIG. 12) of the first protocol log including no identification data. To put it specifically, the data merging unit 109 calculates the time of message receiving of the log minus the time correction value. For the example described above, the data merging unit 109 consequently corrects the time of message receiving "00:00:00.120" to "00.00.00.070", and further corrects "00:00:00.200" to "00.00.00.250".

Figure 15:
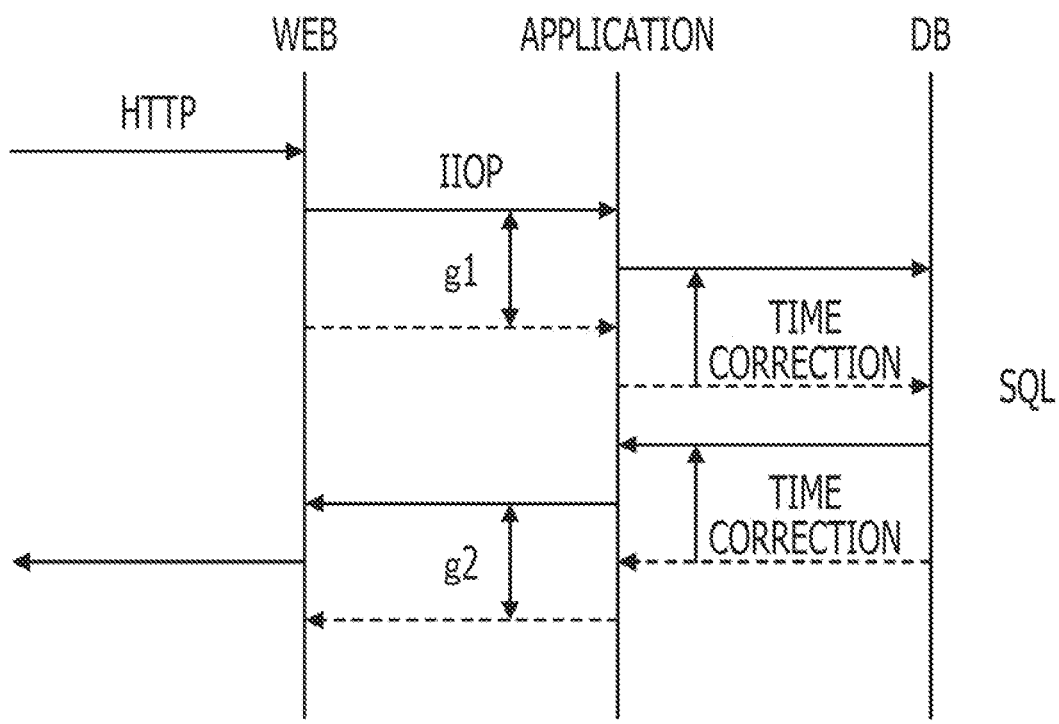
FIG. 15 schematically explains a time lag and time correction upon the second protocol log being the reference.

Upon the second protocol log being the reference, overlap the sequence diagrams on the left and right sides in FIG. 13 to obtain a sequence diagram illustrated in FIG. 15. Calculate the time correction value from the time lags g1 and g2 in substantially the same manner as illustrated in FIG. 14. As the references are different, however, signs of the time correction values are different. Then, calculate the time when the SQL message on the dotted arrow line included in the first protocol log is received to the time when the SQL message on the solid arrow line is received with the time correction value as indicated by an upward arrow.

The times when the messages are received are different depending upon whether the first protocol log or the second protocol log is the reference as described above, which causes no problem in particular because relative time difference and turns are important for the following process.

Figure 16:
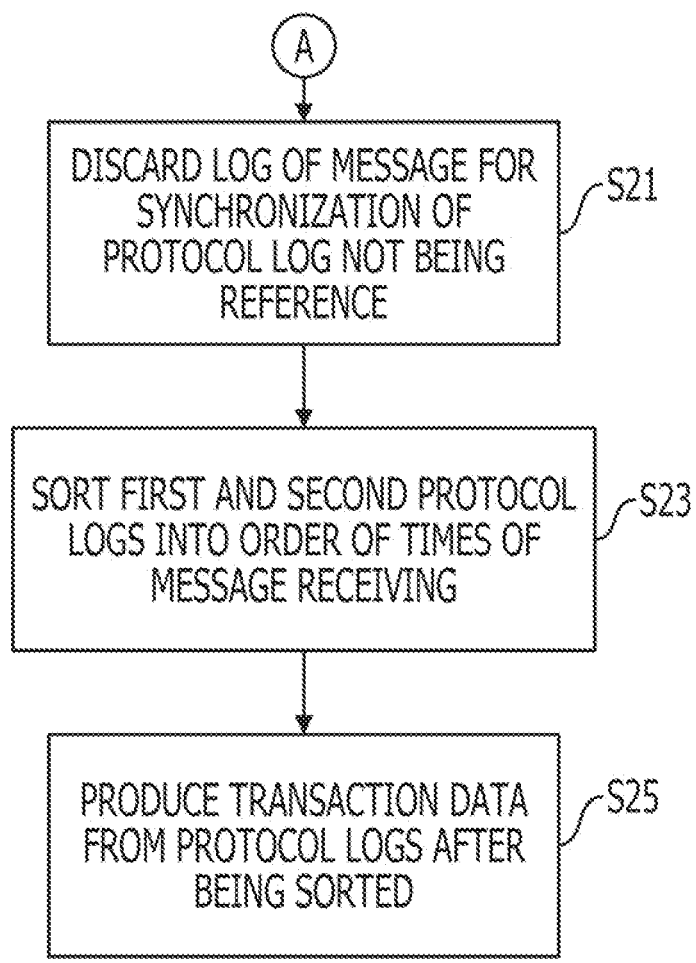
FIG. 16 illustrates a main processing flow of the embodiment.

The process shifts to a process illustrated in FIG. 16 through a terminal A. The data merging unit 109 further discards the log of the message for synchronization (e.g., the log including the identification data) of the protocol log not being the reference received in the regular period of time (step S21), so as to exclude an overlap. Upon the first protocol log being the reference, the data merging unit 109 discards the log of the IIOP message that is the log of the message for synchronization of the second protocol log. For the example illustrated in FIG. 14, the log of the IIOP message represented by the dotted arrow line is discarded. Meanwhile, upon the second protocol log being the reference, the data merging unit 109 discards the log of the IIOP message that is the log of the message for synchronization of the first protocol log. For the example illustrated in FIG. 15, similarly, the log of the IIOP message represented by the dotted arrow line is discarded.

If the first protocol log is the reference, the second protocol log storing unit 106 is in a state where data illustrated in FIG. 17 is stored therein. The time when the HTTP message is received is a post-correction value, and the log of the IIOP message has been discarded and is no more included therein.

If the second protocol log is the reference, the first protocol log storing unit 104 is in a state where data illustrated in FIG. 18 is stored therein. The time when the SQL message is received is a post-correction value, and the log of the IIOP message has been discarded and is no more included therein.

Incidentally, the step S21 can include a process for removing the identification data registered in the protocol log being the reference.

Then, the data merging unit 109 sorts the first protocol log in the regular period of time stored in the first protocol log storing unit 104 and the second protocol log in the regular period of time stored in the second protocol log storing unit 106 into order of the times of message receiving. The data merging unit 109 stores a result of sorting the protocol logs in the post-correction protocol log storing unit 110 (step S23). If the first protocol log is the reference, data illustrated in FIG. 19 is stored in the post-correction protocol log storing unit 110. FIG. 19 enumerates messages in order of the messages illustrated in FIG. 2. Meanwhile, if the second protocol log is the reference, data illustrated in FIG. 20 is stored in the post-correction protocol log storing unit 110. If FIG. 19 is compared with FIG. 20, the times when the messages are received are different, but the order of the messages and the time lags between the messages are equal.

Figure 1:
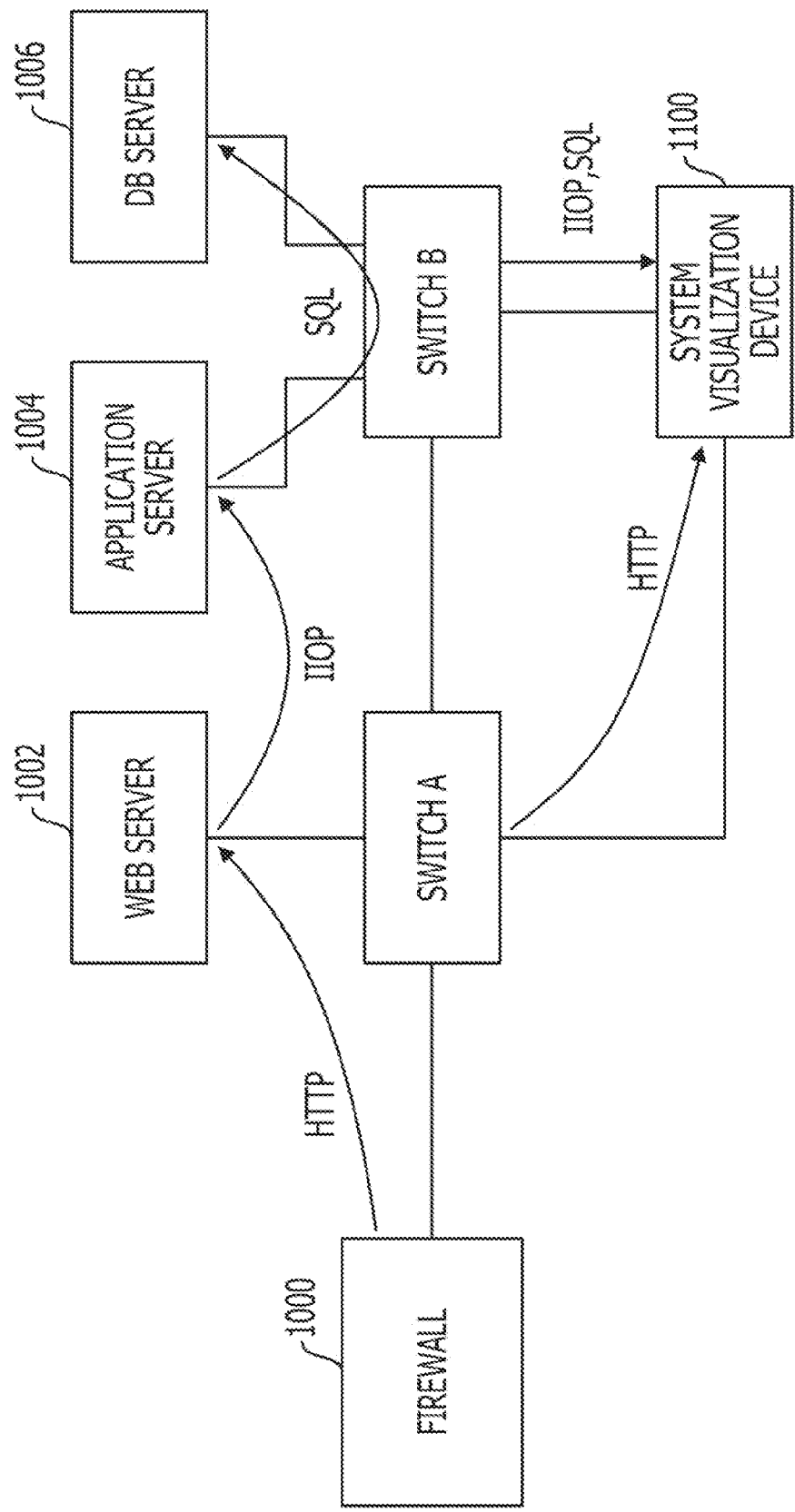
FIG. 1 illustrates an example ordinary system.
Figure 2:
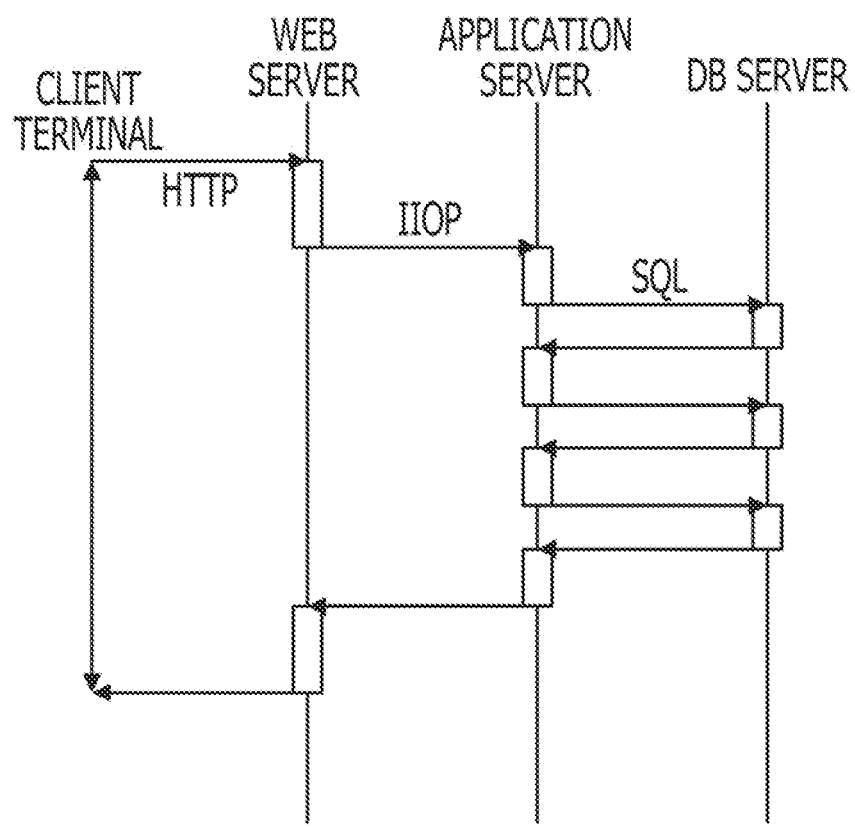
FIG. 2 illustrates an example transaction.
Figure 3:
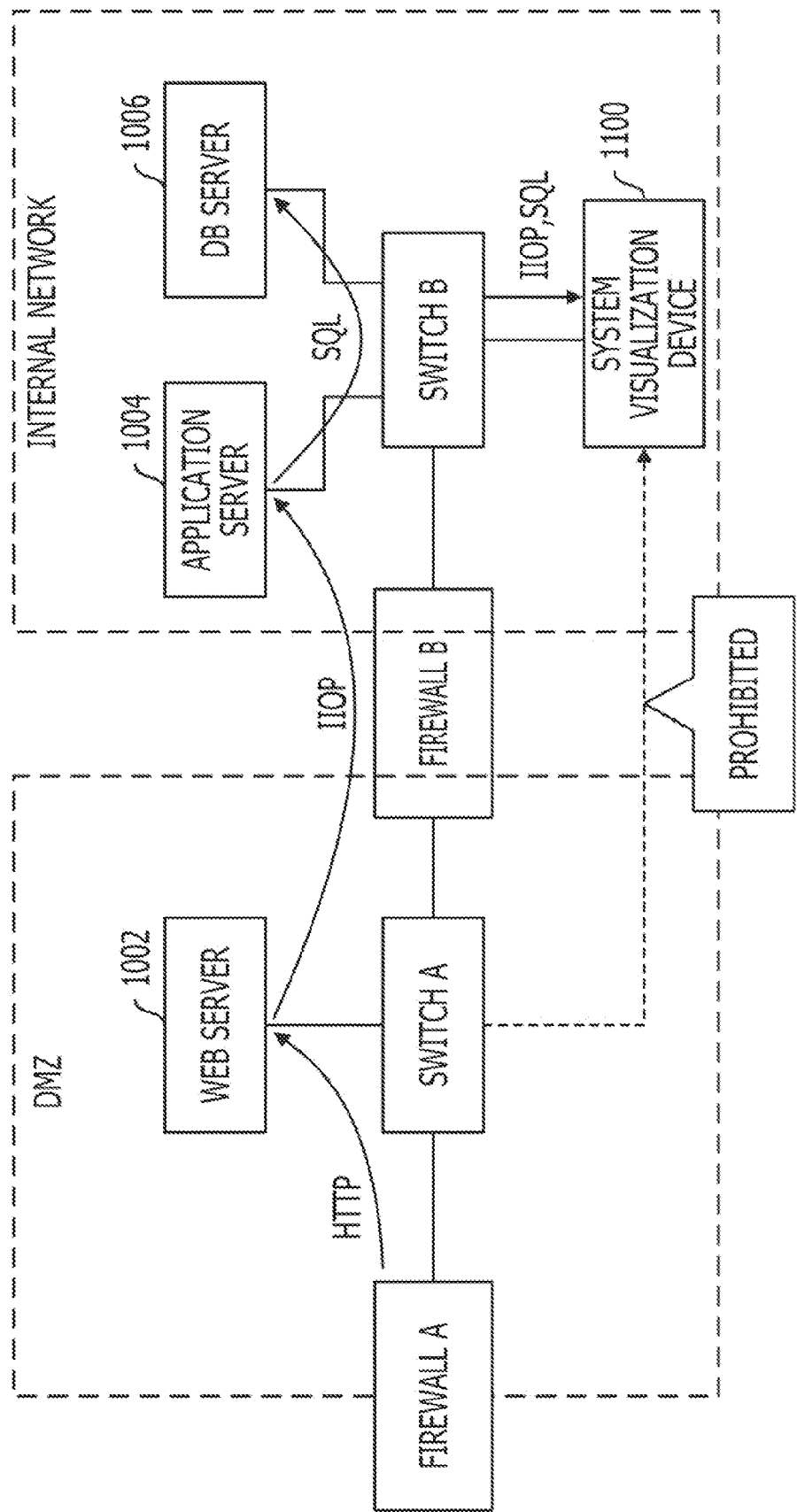
FIG. 3 illustrates an example problem.

Then, the log analyzing unit 111 carries out a log analysis process by using the log data stored in the post-correction protocol log storing unit 110, specifies a transaction of the system to be analyzed and stores data of the transaction in the transaction data storing unit 112 (step S25). As the content of the log analysis process is disclosed in, e.g., Japanese Unexamined Patent Application Publication No. 2006-11683, and the process for producing the data as illustrated in FIG. 2 will not be described herewith in detail.

Even in a case where a system to be analyzed is divided into a plurality of segments and a message in an individual segment cannot be directly transmitted to another segment, a transaction in the system to be analyzed can be correctly grasped by the implementation of the process described above.

Incidentally, repeat the process through the steps S13-S23 at regular intervals (e.g., every one minute), and store the result of the process in the post-correction protocol log storing unit 110.

Figure 21:
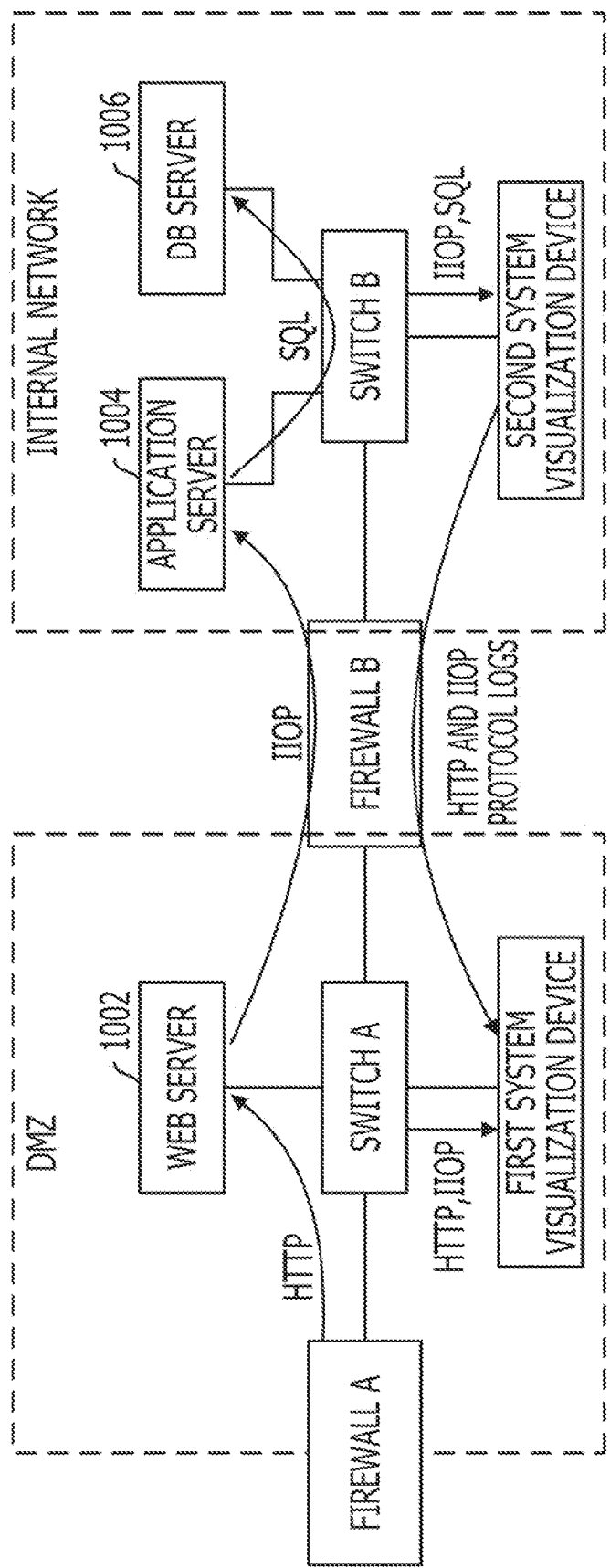
FIG. 21 illustrates an example arrangement in which the first system visualization device and the second system visualization device are exchanged for each other.

Although the DMZ and the internal network are provided with the second system visualization device 200 and the first system visualization device 100, respectively, for the example described above, the DMZ and the internal network can be provided with the first system visualization device 100 and the second system visualization device 200, respectively, as illustrated in FIG. 21. A protocol log is transmitted from the internal network to the DMZ in this case, which causes no security problem in particular as not a message itself but the protocol log is transmitted.

The embodiment disclosed herewith has been explained above. The art disclosed herewith is not limited to this embodiment. For instance, the functional block diagrams illustrated in FIGS. 5 and 6 are example only, and do not necessarily agree with a practical program module configuration in some cases. Further, e.g., as the result of the process does not change even if the turns of the steps S21 and S19 of the processing flow are exchanged for each other, the steps can be exchanged or carried out parallel to each other in such a case.

Figure 22:
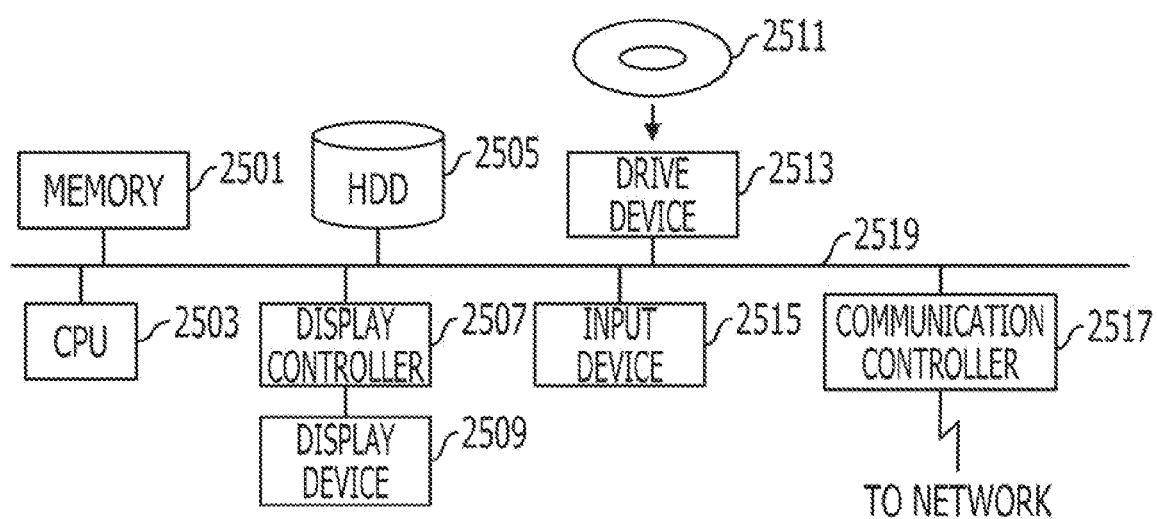
FIG. 22 is a functional block diagram of a computer.

Further, the system visualization devices 100 and 200 are computer devices. As illustrated in FIG. 22, a memory 2501, a CPU 2503, a hard disk drive (HDD) 2505, a display controller 2507 to be connected to a display device 2509, a drive device 2513 for a removable disk 2511, an input device 2515 and a communication controller 2517 to be connected to the network are connected to one another by a bus 2519. An operating system (OS) and an application program for carrying out the process of the embodiment are stored in the HDD 2505, and are read from the HDD 2505 into the memory 2501 in order to be run by the CPU 2503. The CPU 2503 controls the display controller 2507, the communication controller 2517 and the drive device 2513. Further, data in the middle of a process is stored in the memory 2501, and may be stored in the HDD 2505. According to the embodiment of the art disclosed herewith, the application program for carrying out the process described above is distributed while being stored in the computer-readable removable disk 2511, and is installed from the drive device 2513 into the HDD 2505. The application program may be installed into the HDD 2505 through a network such as the Internet and the communication controller 2517 in some cases. The hardware including the CPU 2503, the memory 2501, etc., the OS and the application program systematically and jointly work so that the computer device implements the various functions described above.

Incidentally, a program for making a computer carry out the process described above can be written, and the program is stored in a computer-readable non-transitory medium or a storage device such as a flexible disk, a CD-ROM, a magneto-optical disk, a semiconductor memory (e.g., a ROM) or a hard disk. Incidentally, data in the middle of the process is temporarily stored in a storage device such as a RAM.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions has been described in detail, it should be understood that the various changes, substitutions, and alterations could be made hereto without departing from the spirit and scope of the invention.

What is claimed is:

1. A computer-readable, non-transitory medium storing therein a system visualization processing program that causes a computer to execute a process, the process comprising:

carrying out a receiving process to receive a first message transmitted or received by a server from a communication device connected to the server;

storing the first message in a message storing unit in connection with a first time information indicating when the receiving process is carried out;

extracting a second message and a third message other than the second message from the message storing unit;

producing log data including identification data to identify the second message and a second time information indicating when the second message is received, the log data being used for synchronizing the computer with a log data processing device connected to a network on an opposite side of a firewall connected to the communication device;

producing another log data including a third time information indicating when the third message is received;

storing the log data and the another log data in a log data storing unit; and transmitting the log data and the another log data stored in the log data storing unit, but not the second message nor the third message, to the log data processing device.

2. A computer-readable, non-transitory medium storing therein a system visualization processing program that causes a computer to execute a process, the process comprising:

carrying out a receiving process to receive a first message transmitted or received by a server from a communication device connected to the server;

storing the first message in a message storing unit in connection with a first time information indicating when the receiving process is carried out;

extracting a second message and a third message other than the second message from the message storing unit;

producing second log data including identification data to identify the second message and a second time information indicating when the second message is received, the second log data being used for synchronizing the computer with a log data processing device connected to a network on an opposite side of a firewall connected to the communication device;

producing third log data including a third time information indicating when the third message is received;

storing the second log data and the third log data in a first log data storing unit;

receiving fourth log data of the second message and fifth log data of a fifth message, but not the second message nor the fifth message, from the log data processing device, the fourth log data including the identification data for the second message and a fourth time information indicating when the second message for synchronization is received by the log data processing device, and the fifth log data including a fifth time information when the fifth message is received by the log data processing device;

storing the fourth log data and the fifth log data in a second log data storing unit;

extracting the second log data and the fourth log data including the identification data;

calculating a time correction value from a difference between the second time information and the fourth time information;

correcting the third time information of the third log data or the fifth time information of the fifth log data with the time correction value;

discarding the second log data or the fourth log data; and generating transaction information based on time information of the second log data, the third log data, the fourth log data, and the fifth log data after the correcting and the discarding.

3. The computer-readable, non-transitory medium according to claim 1, wherein the identification data is message identification data of a particular protocol or a sender's address and a packet identifier of the second message.

4. The computer-readable, non-transitory medium according to claim 2, wherein the identification data is message identification data of a particular protocol or a sender's address and a packet identifier of the second message.

5. The computer-readable, non-transitory medium according to claim 2, wherein the calculating the time correction value includes:

calculating the difference between the second time information and the fourth time information for a plurality of sets of the extracted second and fourth log data; and calculating a statistical value of the difference between the second time information and fourth time information as the time correction value.

6. A method for a system visualization process executed by a computer, the method comprising:

carrying out a receiving process to receive a first message transmitted or received by a server from a communication device connected to the server;

storing the first message in a message storing unit in connection with a first time information indicating when the receiving process is carried out;

extracting a second message and a third message other than the second message from the message storing unit;

producing log data including identification data to identify the second message and a second time information indicating when the second message is received, the log data being used for synchronizing the computer with a log data processing device connected to a network on an opposite side of a firewall connected to the communication device;

producing another log data including a third time information indicating when the third message is received;

storing the log data and the another log data in a log data storing unit; and transmitting the log data and the another log data stored in the log data storing unit, but not the second message nor the third message, to the log data processing device.

7. A method for a system visualization process executed by a computer, the method comprising:

carrying out a receiving process to receive a first message transmitted or received by a server from a communication device connected to the server;

storing the first message in a message storing unit in connection with a first time information indicating when the receiving process is carried out;

extracting a second message and a third message other than the second message from the message storing unit;

producing second log data including identification data to identify the second message and a second time information indicating when the second message is received, the second log data being used for synchronizing the computer with a log data processing device connected to a network on an opposite side of a firewall connected to the communication device;

producing third log data including a third time information indicating when the third message is received;

storing the second log data and the third log data in a first log data storing unit;

receiving fourth log data of the second message and fifth log data of a fifth message, but not the second message nor the fifth message, from the log data processing device, the fourth log data including the identification data for the second message and a fourth time information indicating when the second message for synchronization is received by the log data processing device, and the fifth log data including a fifth time information when the fifth message is received by the log data processing device;

storing the fourth log data and the fifth log data in a second log data storing unit;

extracting the second log data and the fourth log data including the identification data;

calculating a time correction value from a difference between the second time information and the fourth time information;

correcting the third time information of the third log data or the fifth time information of the fifth log data with the time correction value;

discarding the second log data or the fourth log data; and generating transaction information based on time information of the second log data, the third log data, the fourth log data, and the fifth log data after the correcting and the discarding.

8. A device comprising:

a capturing unit configured to carry out a receiving process to receive a first message transmitted or received by a server from a communication device connected to the server, the capturing unit being configured to store the first message in a message storing unit in connection with a first time information indicating when the receiving process is carried out;

an analyzing unit configured to extract a second message and a third message other than the second message from the message storing unit, the analyzing unit being configured to produce log data including identification data to identify the second message and a second time information indicating when the second message is received, the log data being used for synchronizing the device with a log data processing device connected to a network on an opposite side of a firewall connected to the device, the analyzing unit being configured to produce another log data including a third time information indicating when the third message is received, the analyzing unit being configured to store the log data and the another log data in a log data storing unit; and a communication controller configured to transmit the log data and another log data, but neither the second message nor the third message, stored to the log data processing device.

9. A device comprising:

a processor configured to execute a procedure, the procedure comprising:

carrying out a receiving process to receive a first message transmitted or received by a server from a communication device connected to the server;

storing the first message in a message storing unit in connection with a first time information indicating when the receiving process is carried out;

extracting a second message and a third message other than the second message from the message storing unit;

producing log data including identification data to identify the second message and a second time information indicating when the second message is received, the log data being used for synchronizing the device with a log data processing device connected to a network on an opposite side of a firewall connected to the communication device;

producing another log data including a third time information indicating when the third message is received;

storing the log data and the another log data in a log data storing unit; and transmitting the log data and the another log data stored in the log data storing unit, but not the second message nor the third message, to the log data processing device.

10. A device comprising:

a capturing unit configured to carry out a receiving process to receive a first message transmitted or received by a server from a communication device connected to the server, the capturing unit being configured to store the first message in a message storing unit in connection with a first time information indicating when the receiving process is carried out;

an analyzing unit configured to extract a second message and a third message other than the second message from the message storing unit, the analyzing unit being configured to produce second log data including identification data to identify the second message and a second time information when the second message is received, the second log data being used for synchronizing the device with a log data processing device connected to a network on an opposite side of a firewall connected to the communication device, the analyzing unit being configured to produce third log data including third time information indicating when the third message is received, the analyzing unit being configured to store the second log data and the third log data in a first log data storing unit;

a log data receiving unit configured to receive fourth log data of the second message and fifth log data of a fifth message, but not the second message nor the fifth message, from the log data processing device, the fourth log data including the identification data for the second message and a fourth time information indicating when the second message for synchronization is received by the log data processing device, and the fifth log data including a fifth time information when the fifth message is received by the log data processing device, the log data receiving unit being configured to store the fourth log data and the fifth log data in a second log data storing unit;

a time correction value calculating unit configured to extract the second log data and fourth log data including the identification data, the time correction value calculating unit being configured to calculate a time correction value from a difference between the second time information and the fourth time information; and a merging unit configured to correct the third time information of the third log data or the fifth time information of the fifth log data with the time correction value, the merging unit being configured to discard the second log data or the fourth log data, the merging unit being configured to generate transaction information based on time information of the second log data, the third log data, the fourth log data, and the fifth log data.

11. A device comprising:

a processor configured to execute a procedure, the procedure comprising:

carrying out a receiving process to receive a first message transmitted or received by a server from a communication device connected to the server;

storing the first message in a message storing unit in connection with a first time information indicating when the receiving process is carried out;

extracting a second message and a third message other than the second message from the message storing unit;

producing second log data including identification data to identify the second message and a second time information indicating when the second message is received, the second log data being used for synchronizing the device with a log data processing device connected to a network on an opposite side of a firewall connected to the communication device;

producing third log data including a third time information indicating when the third message is received;

storing the second log data and the third log data in a first log data storing unit;

receiving fourth log data of the second message and fifth log data of a fifth message, but not the second message nor the fifth message, from the log data processing device, the fourth log data including the identification data for the second message and a fourth time information indicating when the second message for synchronization is received by the log data processing device, and the fifth log data including a fifth time information when the fifth message is received by the log data processing device;

storing the fourth log data and the fifth log data in a second log data storing unit;

extracting the second log data and the fourth log data including the identification data;

calculating a time correction value from a difference between the second time information and the fourth time information;

correcting the third time information of the third log data or the fifth time information of the fifth log data with the time correction value;

discarding the second log data or the fourth log data; and generating transaction information based on time information of the second log data, the third log data, the fourth log data, and the fifth log data after the correcting and the discarding.

* * * * *